(12) United States Patent
Akishiba

(10) Patent No.: US 8,102,537 B2
(45) Date of Patent: Jan. 24, 2012

(54) OPTICAL DISPLACEMENT GAGE

(75) Inventor: Yuji Akishiba, Osaka (JP)

(73) Assignee: Keyence Corporation, Osaka (JP)

( * ) Notice: Subject to any disclaimer, the term of this patent is extended or adjusted under 35 U.S.C. 154(b) by 328 days.

(21) Appl. No.: 12/607,357

(22) Filed: Oct. 28, 2009

(65) Prior Publication Data

US 2010/0123898 A1    May 20, 2010

(30) Foreign Application Priority Data

Nov. 17, 2008  (JP) ................................ 2008-293851

(51) Int. Cl.
  *G01B 9/02*    (2006.01)
  *G01B 11/02*   (2006.01)

(52) U.S. Cl. ...................................... 356/482; 356/496

(58) Field of Classification Search .................. 356/482, 356/496, 498

See application file for complete search history.

(56) References Cited

U.S. PATENT DOCUMENTS

| | | | |
|---|---|---|---|
| 5,610,716 A | 3/1997 | Sorin et al. | |
| 7,158,240 B2 * | 1/2007 | Ryerson et al. | 356/601 |
| 7,349,099 B2 * | 3/2008 | Tai et al. | 356/482 |
| 7,515,275 B2 * | 4/2009 | Beaulieu et al. | 356/482 |
| 2006/0126991 A1 * | 6/2006 | Huang | 385/12 |
| 2006/0132793 A1 * | 6/2006 | Ogawa | 356/484 |

FOREIGN PATENT DOCUMENTS

JP          07-004921          1/1995

* cited by examiner

*Primary Examiner* — Michael A Lyons

(74) *Attorney, Agent, or Firm* — Kilyk & Bowersox, P.L.L.C.

(57) ABSTRACT

An optical displacement gage includes the phase determining unit includes a relative phase deciding unit to decide a relative phase of the frequency component within a range of 360 degrees, an absolute phase computing unit to compute an absolute phase by combining the relative phase based on the decision result by the relative phase deciding unit and the past decision result by the relative phase, and a phase reference updating unit to update a reference point of the absolute phase based on a reset instruction, and the displacement amount deciding unit decides the displacement amount based on the absolute phase.

7 Claims, 15 Drawing Sheets

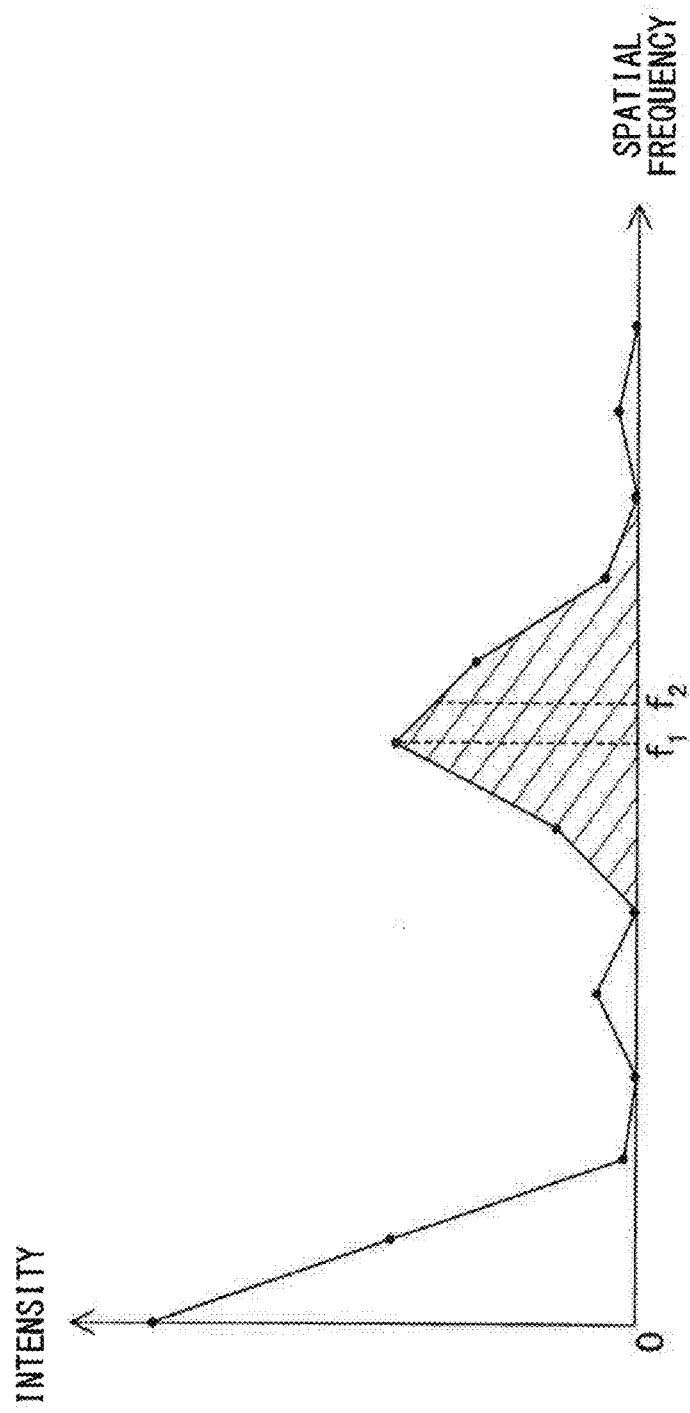

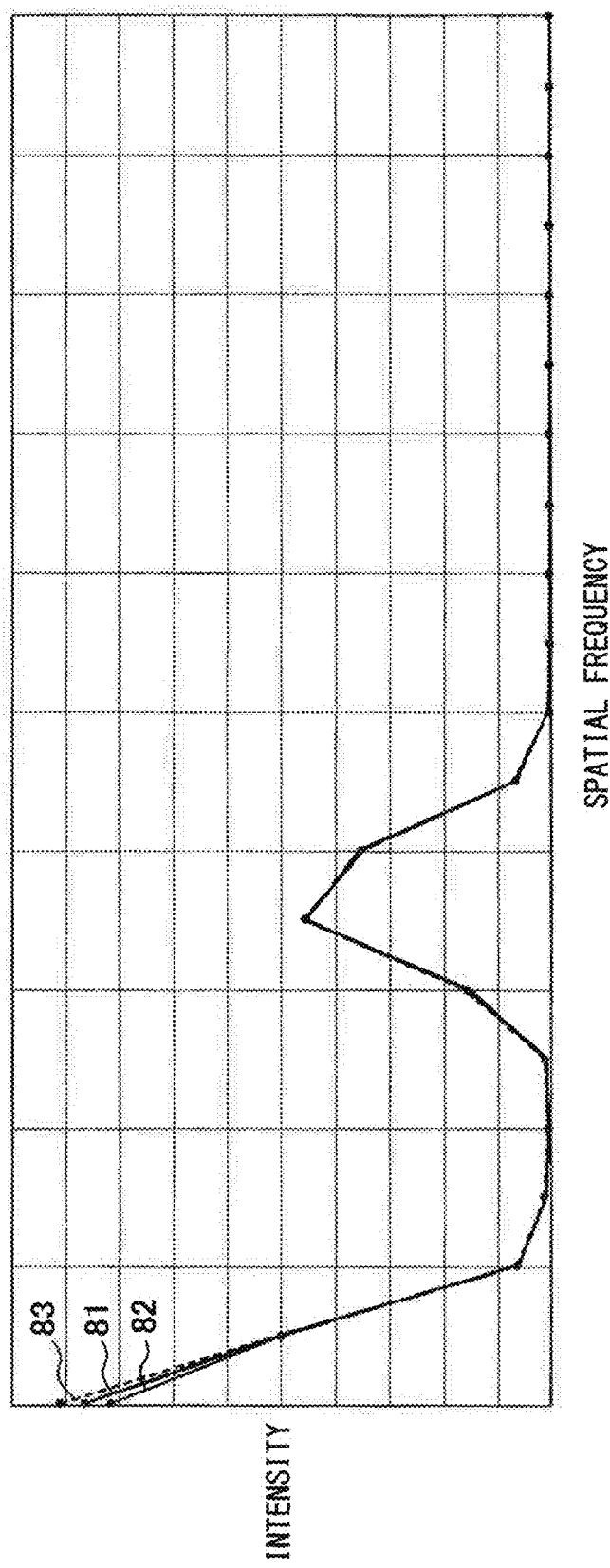

F I G. 1 2 A
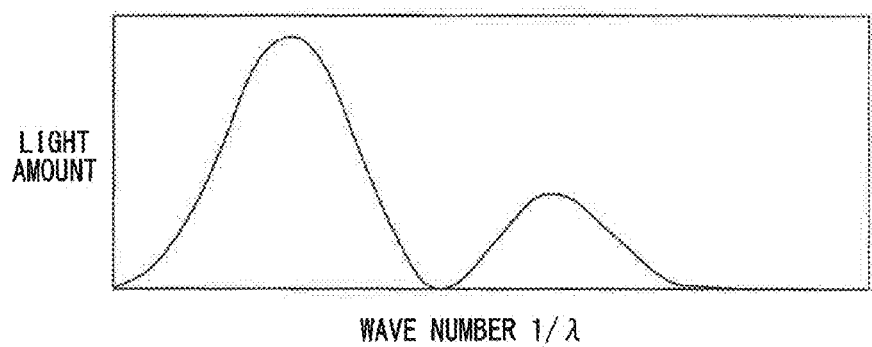
F I G. 1 2 B
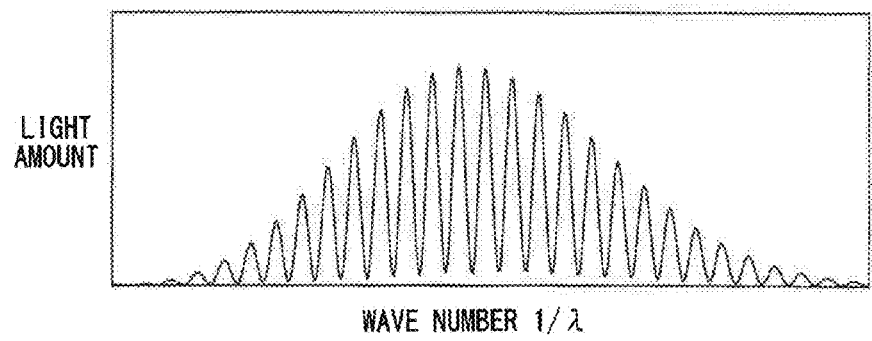

OPTICAL DISPLACEMENT GAGE

CROSS-REFERENCE TO RELATED APPLICATIONS

The present application claims foreign priority based on Japanese Patent Application No. 2008-293851, filed Nov. 17, 2008, the contents of which is incorporated herein by reference.

BACKGROUND OF THE INVENTION

1. Field of the Invention

The present invention relates to an optical displacement gage, and more specifically, relates to improvements of an optical displacement gage for measuring a displacement amount of an object to be measured by utilizing interference between reflection light reflected from a reference surface and reflection light reflected from the object to be measured.

2. Description of the Related Art

Conventionally, there is known a film thickness measuring apparatus for measuring thickness of a transparent film by irradiating the transparent film with wide-band light containing various wavelengths as sensing light for measurement, and by dispersing the interference light of reflection light reflected on the front surface of the transparent film and reflection light reflected on the back surface of the same (see, for example, JP-A-7-4921 and JP-A-9-119815). Usually, in the film thickness measuring apparatus, the interference light including reflection light from the front surface of the transparent film and reflection light from the back surface of the same is dispersed by a dispersing element such as a diffraction grating, a prism or the like, and the dispersed light enters an image sensor having a plurality of light receiving elements arranged linearly. The film thickness is computed based on light reception amount data of individual elements sensed by the image sensor.

The film thickness measuring apparatus described in JP-A-7-4921 extracts neighboring peak points from the intensity distribution of the interference light after the dispersion with respect to the wavelength and computes the film thickness from a wave number difference between the peak points. In addition, the film thickness measuring apparatus described in JP-A-9-119815 performs Fourier transformation of the intensity distribution of the interference light after the dispersion with respect to the wavelength, and determines the peak center from a phase gradient of each frequency component so as to compute the film thickness.

As such a measuring apparatus utilizing interference of reflection light, there is also known an optical displacement gage for measuring a displacement amount of an object to be measured utilizing interference between reflection light from a reference surface and reflection light from the object to be measured. This optical displacement gage includes two types. One type performs Fourier transformation of optical intensity distribution with respect to the wave number of the interference light after the dispersion so as to determine optical intensity distribution with respect to spatial frequency of the light intensity for the wave number, and decides the displacement amount from the spatial frequency at the local maximum. The other type decides the displacement amount from phase of frequency component corresponding to the spatial frequency at the local maximum in the optical intensity distribution with respect to the wave number.

The optical displacement gage that decides the displacement amount directly from the spatial frequency at the local maximum can measure the displacement amount even if the distance between the object to be measured and the reference surface is relatively long. However, if the surface of the object to be measured is dirty with fingerprints or the like, there is a problem that intensity distribution of the interference light will cause a distortion, which affects measurement accuracy to decrease. On the other hand, the optical displacement gage that decides the displacement amount from phase of frequency component corresponding to the spatial frequency at the local maximum is hardly affected by dirt on the surface of the object to be measured, so its measurement accuracy is high compared with the type that decides the displacement amount from the spatial frequency. However, this type has a problem that a measurable range is narrow because it can decide the phase only in the range of 360 degrees.

Further, in case of the film thickness measuring apparatus using a light source device such as a halogen lamp capable of generating white light having a wide wavelength bandwidth, the interference light is transmitted to a spectroscope usually by using an optical fiber having relatively large diameter for sustaining the light amount at a predetermined level or higher. In this measuring apparatus, the sensing light has a wide wavelength bandwidth so that the light amount for each wavelength is not sufficient. Therefore, there is a problem that wavelength resolution of the spectroscope cannot be increased up to a predetermined level or higher.

SUMMARY OF THE INVENTION

The present invention is created in view of the above described problems, and it is an object of the present invention to provide an optical displacement gage having an expanded measurable range without lowering measurement accuracy. In particular, it is an object of the present invention to expand the measurable range of the optical displacement gage that decides a displacement amount from phase of frequency component corresponding to spatial frequency at the local maximum. It is also an object of the present invention to provide an optical displacement gage with increased measurement accuracy by raising the wavelength resolution of the spectroscope.

An optical displacement gage according to a first aspect of the present invention includes a sensing light generating unit to generate a sensing light; a reference surface to reflect a part of the sensing light while transmitting another part of the sensing light toward an object to be measured; a spectroscopic unit to disperse an interference light including a reflection light reflected from the reference surface and reflection light reflected from the object to be measured; an optical intensity distribution generating unit to receive the interference light dispersed by the spectroscopic unit so as to generate an optical intensity distribution with respect to a wave number of the interference light; a light intensity local maximum extracting unit to convert the optical intensity distribution with respect to the wave number into an optical intensity distribution with respect to a spatial frequency of the light intensity for the wave number, so as to extract a local maximum in the optical intensity distribution with respect to the spatial frequency, repeatedly at a predetermined respective time; a phase determining unit to determine a phase of the frequency component corresponding to the spatial frequency at the local maximum in the optical intensity distribution with respect to the wave number; and a displacement amount deciding unit to decide a displacement amount of the object to be measured based on the phase determined by the phase determining unit, wherein the phase determining unit includes a relative phase deciding unit to decide a relative phase of the frequency component within a range of 360 degrees, an absolute phase computing unit to compute an absolute phase by combining the relative phase based on the decision result by the relative phase deciding unit and the past decision result by the relative phase, and a phase reference updating unit to update a reference point of the absolute phase based on a reset instruction, and the displacement amount deciding unit decides the displacement amount based on the absolute phase.

In this optical displacement gage, a displacement amount of the object to be measured is decided by utilizing interference between reflection light reflected from the reference surface and reflection light from the object to be measured. In this case, the optical intensity distribution with respect to the wave number of the interference light after the dispersion is converted into the optical intensity distribution with respect to spatial frequency of the light intensity for the wave number, and local maximum therein is extracted. Then, a displacement amount is decided based on the phase of the frequency component corresponding to the spatial frequency at the local maximum in the optical intensity distribution with respect to the wave number. The phase of the frequency component is determined based on the relative phase decided within a range of 360 degrees and the past decision result of the relative phase, as absolute phase obtained by combining the relative phases. According to this structure, a displacement amount is decided based on the phase of the frequency component corresponding to the spatial frequency at the local maximum. Therefore, it is hardly affected by dirt on the surface of the object to be measured, so that measurement accuracy can be improved compared with the type in which a displacement amount is decided directly from the spatial frequency at the local maximum. In addition, the relative phase is combined so as to determine the absolute phase, and a displacement amount is decided based on the absolute phase. Therefore, the measurable range can be expanded.

An optical displacement gage according to a second aspect of the present invention, in addition to the structure described above, includes a structure in which the absolute phase computing unit decides that the relative phase has been obtained crossing the upper limit or the lower limit if a difference between the last obtained relative phase and the just previously obtained relative phase is larger than a first threshold value, so as to combine the relative phase.

An optical displacement gage according to a third aspect of the present invention, in addition to the structure described above, includes a display unit for performing warning display if a difference between the last obtained relative phase and the just previously obtained relative phase exceeds a second threshold value that is smaller than the first threshold value. According to this structure, the warning display is performed when a difference between the last obtained relative phase and the just previously obtained relative phase exceeds a second threshold value. Therefore, the user can be informed of a potential situation that a variation of the displacement amount may become so large that combination of the relative phases cannot follow, if it is probable.

An optical displacement gage according to a fourth aspect of the present invention, in addition to the structure described above, includes a structure in which the light intensity local maximum extracting unit performs a barycenter process of intensity data of the individual spatial frequency so as to determine the local maximum. According to this structure, the local maximum is determined by the barycenter process of the intensity data of the individual spatial frequency. Therefore, measurement accuracy of the displacement amount can be improved compared with the case where peak point in the intensity data is simply regarded as local maximum.

An optical displacement gage according to a fifth aspect of the present invention, in addition to the structure described above, includes a detection range estimating unit for estimating a detection range for the absolute phase based on the spatial frequency at the local maximum. The absolute phase computing unit determines the absolute phase based on the estimation result by the detection range estimating unit. According to this structure, the detection range is estimated from the spatial frequency at the local maximum so that the absolute phase is determined. Therefore, the displacement amount can be decided correctly even if a variation of the displacement amount is so large that combination of the relative phases cannot follow.

An optical displacement gage according to a sixth aspect of the present invention, in addition to the structure described above, has a structure in which a single mode optical fiber that transmits light in a single mode is used for transmitting the sensing light and the interference light. According to this structure, occurrence of an optical path difference in the light propagating in the optical fiber can be suppressed. Therefore, measurement accuracy of the displacement amount can be further improved.

An optical displacement gage according to a seventh aspect of the present invention, in addition to the structure described above, has a structure in which the sensing light is near infrared light having a narrow wavelength bandwidth compared with white light. According to this structure, a light amount of each wavelength can be secured sufficiently so that the wavelength resolution of the spectroscope can be raised sufficiently. Therefore, measurement accuracy of the displacement amount can be further improved.

According to the optical displacement gage of the present invention, the displacement amount is decided based on the phase of the frequency component corresponding to the spatial frequency at the local maximum. Therefore, dirt on the surface of the object to be measured hardly affects, so that the measurement accuracy can be improved compared with the case where the displacement amount is decided directly from the spatial frequency at the local maximum. In addition, relative phase is combined so as to determine the absolute phase, and the displacement amount is decided based on the absolute phase. Therefore, the measurable range can be expanded. Thus, an optical displacement gage having the expanded measurable range without lowering the measurement accuracy can be realized. In addition, the sufficient light amount can be secured for each wavelength, so that the wavelength resolution of the spectroscope can be raised sufficiently. Therefore, the measurement accuracy of the displacement amount can be further improved.

BRIEF DESCRIPTION OF THE DRAWINGS

FIG. 8 is a diagram illustrating an example of an operation of the spectroscopy 40 illustrated in FIG. 3, in which an FFT spectrum obtained from a relationship between light amount I and wave number $1/\lambda$ is illustrated.

FIG. 10 is a diagram illustrating an example of an operation of the spectroscopy 40 illustrated in FIG. 3, in which an FFT spectrum obtained from the intensity distributions 81 to 83 illustrated in FIG. 9 is illustrated.

FIGS. 12A and 12B are diagrams illustrating a comparison of an example of light amount distribution obtained by using low coherent light as a sensing light L with a case of white light.

DETAILED DESCRIPTION OF THE PREFERRED EMBODIMENTS (Optical Displacement Gage)

Figure 1:
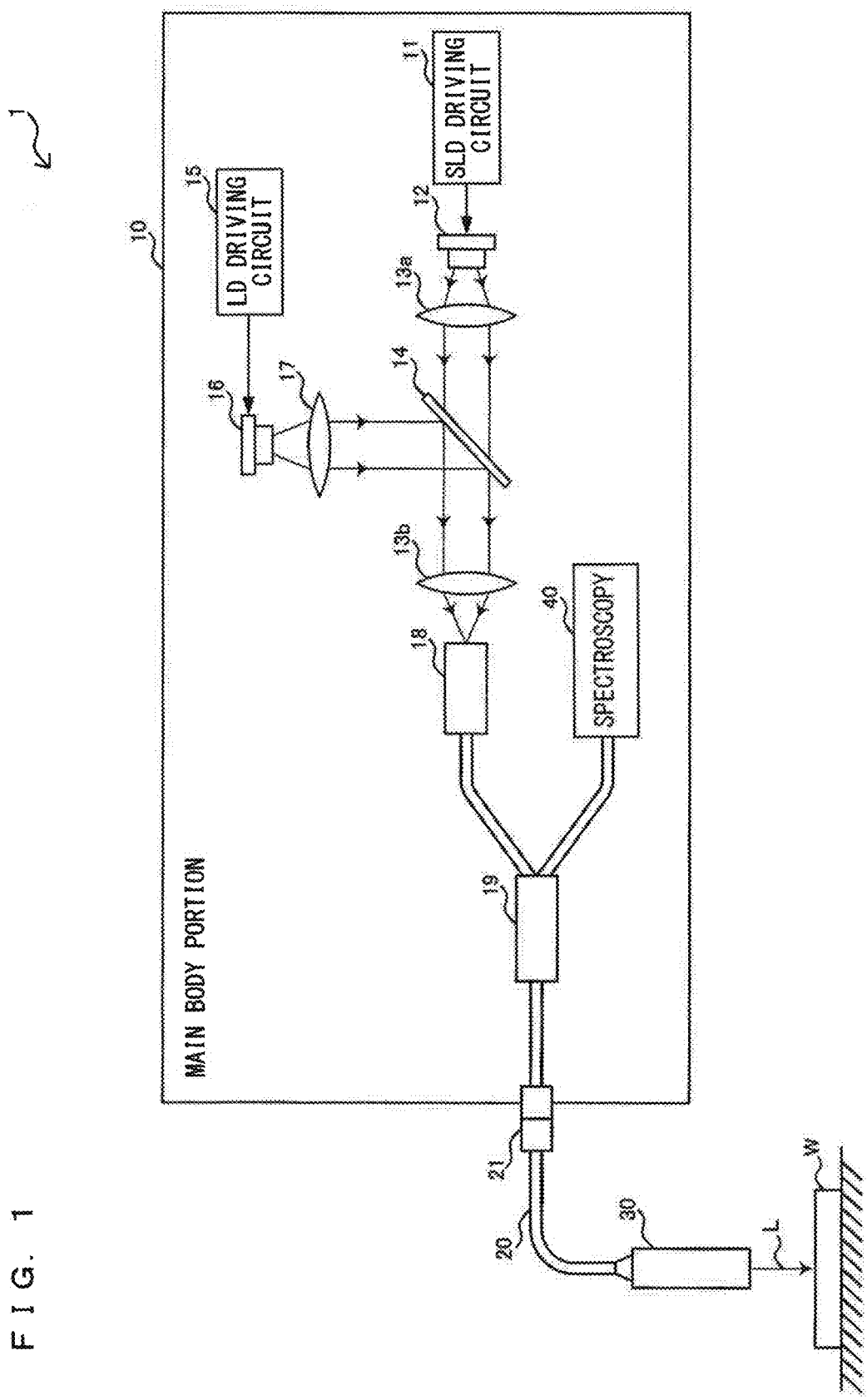
FIG. 1 is a system diagram illustrating an example of a general structure of an optical displacement gage 1 according to an embodiment of the present invention.

FIG. 1 is a system diagram illustrating an example of a general structure of an optical displacement gage 1 according to an embodiment of the present invention. The optical displacement gage 1 is a measuring apparatus for measuring a displacement amount of a work (object to be measured) W by using low coherent light containing various wavelengths as sensing light L for measurement. The optical displacement gage 1 includes a main body portion 10, a transmission cable 20, a connector 21 and a head portion 30.

The main body portion 10 is a processing unit which generates the sensing light L for irradiating the work W and measures a displacement amount of the work W by dispersing reflection light from the work W. The main body portion 10 includes an SLD driving circuit 11, an SLD 12, collimator lenses 13a and 17, a condensing lens 13b, a cold mirror 14, an LD driving circuit 15, an LD 16, a ferrule 18, a fiber splitter 19 and a spectroscopy 40.

The SLD driving circuit 11 is a driver circuit for controlling to drive the SLD 12. The SLD (that stands for Super Luminescent Diode) 12 is a light source device for generating low coherent light as the sensing light L for measurement and may also be referred to as a high luminance light emission diode (SLED). For instance, near infrared light having a wavelength of approximately 0.70 to 1.0 μm is generated as the sensing light L. Here, it is supposed that light having center wavelength of 0.85 μm and half width of 0.02 μm is generated by the SLD 12.

The SLD 12 generating such the sensing light L is a light source device having a wavelength bandwidth narrower than white light generated by a light source device such as a halogen lamp (having center wavelength of 0.60 μm and half width of 0.20 μm).

The collimator lens 13a is a condensing lens that condenses the sensing light L from the SLD 12 so as to emerge as parallel rays substantially parallel to the center axis. The condensing lens 13b is an optical element that condenses the sensing light L from the collimator lens 13a so as to emerge toward an end surface of the ferrule 18. The collimator lens 13a and the condensing lens 13b are optical fiber coupling lenses for the optical fiber to receive the sensing light L emitted from the SLD 12.

The ferrule 18 is a coupling member which retains an end portion of the optical fiber for transmitting the sensing light. The SLD 12, the collimator lens 13a, the condensing lens 13b and the ferrule 18 are arranged so that center axes thereof agree with each other.

The LD driving circuit 15 is a driver circuit for controlling to drive the LD 16. The LD (that stand for Laser Diode) 16 is a light source device which generates a visible light as a guide light for indicating an irradiation spot of the sensing light L on the work W. In other words, the guide light from the LD 16 is used for visualize a measuring spot by the sensing light L.

For instance, a red light having wavelength of 0.65 μm is generated by the LD 16. The guide light from the LD 16 is projected to the work W at a post stage of the cold mirror 14 through the same transmission path as the sensing light L.

The cold mirror 14 is an optical element that transmits the sensing light L coming from the SLD 12 through the collimator lens 13a toward the condensing lens 13b as it is, while reflecting the guide light that comes from the LD 16 through the collimator lens 17 toward the condensing lens 13b. In other words, if infrared light enters the cold mirror 14, the infrared light passes through the same as it is, while if visible light enters the same, the visible light is reflected totally by the same.

The fiber splitter 19 is a beam splitter having a fiber shape, which is connected to the ferrule 18, the spectroscopy 40 and the connector 21 via optical fibers. The fiber splitter 19 transmits the sensing light L from the ferrule 18 to the connector 21 as it is, and transmits the light from the connector 21 mainly to the spectroscopy 40. Specifically, the ferrule 18 and the spectroscopy 40 are coupled to an end portion of the fiber splitter 19, while the connector 21 is coupled to the other end portion.

The transmission cable 20 is an optical transmission medium constituted of an optical fiber that transmits the sensing light L from the main body portion 10 to the head portion 30. The transmission cable 20 is constituted of a core fiber made of light guide material and a resin film covering the core fiber. The transmission cable 20 is coupled to the main body portion 10 in a detachable manner via the connector 21.

The head portion 30 is a measuring unit for projecting the sensing light L from the main body portion 10 toward the work W. For instance, the head portion 30 is disposed above a conveying path for conveying the work W.

The sensing light L emitted from the SLD 12 enters the collimator lens 13a and emerges as parallel rays. The parallel rays enter the condensing lens 13b through the cold mirror 14 and emerges toward the end surface of the ferrule 18. The sensing light L enters the optical fiber through the ferrule 18 and is transmitted to the connector 21 through the fiber splitter 19. Then, the sensing light L is transmitted through the connector 21 and the transmission cable 20 to the head portion 30, and emerges toward the work W.

On the other hand, when the sensing light L is projected, a part of the sensing light L is reflected on the surface of the work W to be reflection light, and a part of the reflection light enters the head portion 30. The reflection light is transmitted to the spectroscopy 40 through the transmission cable 20 and the fiber splitter 19. The spectroscopy 40 disperses the reflection light, and an operation of computing a displacement amount of the work W from a result of the dispersion is performed.

(Head Portion)

Figure 2:
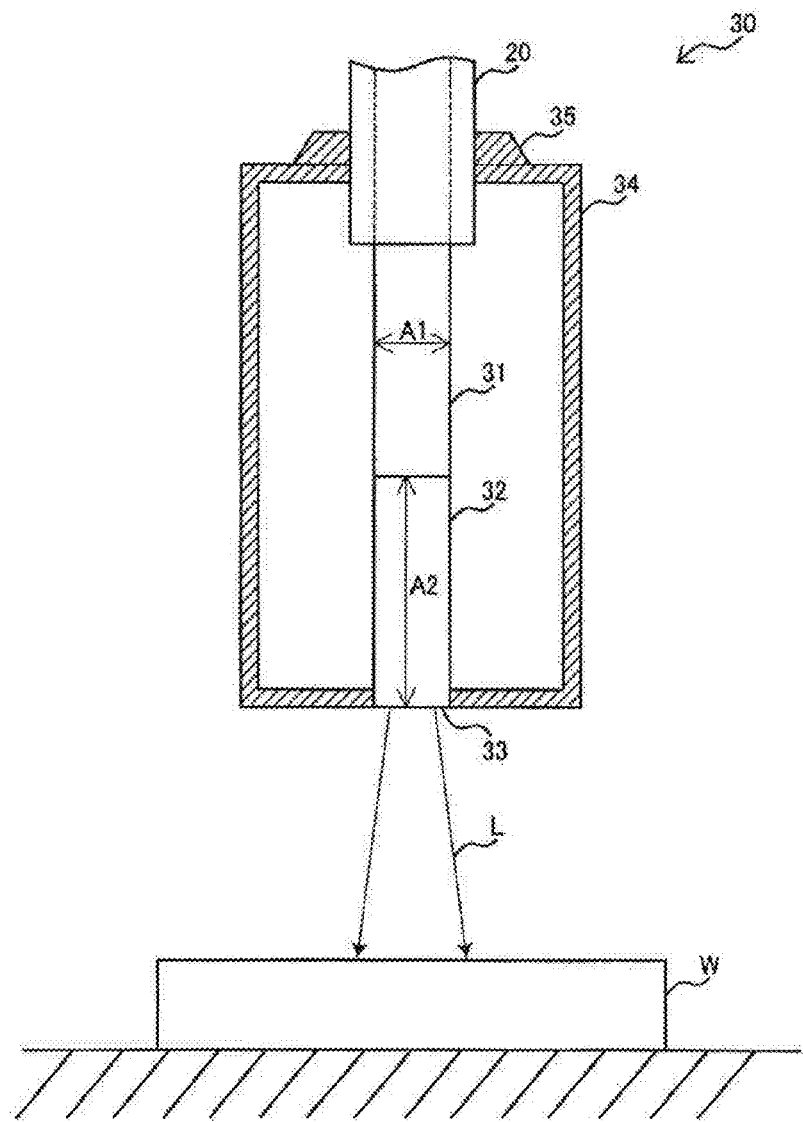
FIG. 2 is a diagram illustrating a structural example of a head portion 30 of the optical displacement gage 1 illustrated in FIG. 1, in which an inner structure of the head portion 30 is illustrated.

FIG. 2 is a diagram illustrating a structural example of a head portion 30 of the optical displacement gage 1 illustrated in FIG. 1, in which an inner structure of the head portion 30 is illustrated. This head portion 30 is constituted of a core fiber 31 protruding from the end surface of the transmission cable 20, a rod lens 32 joined to the end surface of the core fiber 31, and a case 34 for housing the core fiber 31 and the rod lens 32.

The core fiber 31 is an optical fiber made of core and clad for transmitting the sensing light L. The core fiber 31 extends from the end portion of the transmission cable 20 and is disposed in the case 34. The end portion of the transmission cable 20 is retained by a supporting portion 35 provided to the case 34.

The rod lens 32 is a condensing lens that condenses the sensing light L transmitted from the main body portion 10 through the transmission cable 20 and projects the sensing light L toward the work W. The emergence end surface 33 of the rod lens 32 is a flat surface. The rod lens 32 is a cylindrical refractive index distribution lens having the refractive index varying from the center portion to the peripheral portion. The rod lens 32 is a lens for emerging light that is substantially parallel to the center axis and has an irradiation spot that expands along with going away from the emergence end surface 33 as the sensing light L. Specifically, the refractive index is lower in the peripheral portion than in the center portion, and the expanding angle of the sensing light L with respect to the center axis is approximately 1.5 to 2.0.

In addition, the rod lens 32 is formed so that the diameter thereof agree with the diameter A1 of the core fiber 31 and that the focal point is positioned at the emergence end surface 33 or its vicinity. Specifically, if the diameter of the rod lens 32 is 125 μm (A1=125 μm) and the length A2 is 1 to 2 mm, the rod lens 32 is formed so that the focal point is positioned within a range of 100 μm each before and after the emergence end surface 33.

The rod lens 32 is fused to the end surface of the core fiber 31 on the opposite side to the emergence end surface 33.

The sensing light L is emerged from the emergence end surface 33 of the rod lens 32 as parallel rays substantially parallel to the center axis so as to irradiate the work W. A part of the sensing light L irradiating the work W is reflected on the surface of the work W to be reflection light, and a part of the reflection light enters the rod lens 32 through the emergence end surface 33.

In the optical displacement gage 1, interference phenomenon between reflection light from the work W and reflection light from the emergence end surface 33 is utilized for computing a displacement amount of the work W, i.e., a variation of the distance between the emergence end surface 33 and the work W. In other words, the emergence end surface 33 is the reference surface for computing a displacement amount of the work W by utilizing the interference phenomenon, i.e., the reference surface for reflecting a part of the sensing light L while transmitting the other part of the sensing light L toward the work W.

The parallel rays substantially parallel to the center axis of the rod lens 32 are used as the sensing light L for measuring a displacement amount of the work W. Therefore, it is possible to suppress an optical path difference of the reflection light from the work W that may occur between the center portion and the peripheral portion of the sensing light beam. Thus, a displacement amount of the work W can be measured with high accuracy. The distance between the emergence end surface 33 of the head portion 30 and the work W is approximately 0 to 1 mm.

Here, in view of improving measurement accuracy for a displacement amount, the optical fiber constituting the core fiber 31 should be a single mode fiber that transmits the sensing light L in the single mode.

The single mode fiber is a zero dispersion type optical fiber with a thin core, in which the light entering the core is reflected totally at the boundary between the core and the clad, so as to prevent the light from entering from the core into the clad. Thus, occurrence of an optical path difference of the propagating light in the optical fiber is suppressed, so that interference of the propagating light can be prevented.

In general, an optical fiber becomes a single mode fiber if the core diameter is not larger than a predetermined value determined by wavelength of light to be transmitted, while it becomes a multimode fiber if the core diameter is larger than the predetermined value. For instance, if the sensing light L includes near infrared light having a wavelength of 0.85 μm as the center wavelength, the mode field diameter of the core fiber 31 is 5.6 μm.

Here, the single mode fiber that transmits light in the single mode is used for transmitting the sensing light L from the SLD 12 to the rod lens 32, and for transmitting the interference light from the rod lens 32 to the spectroscopy 40.

(Spectroscopy)

Figure 3:
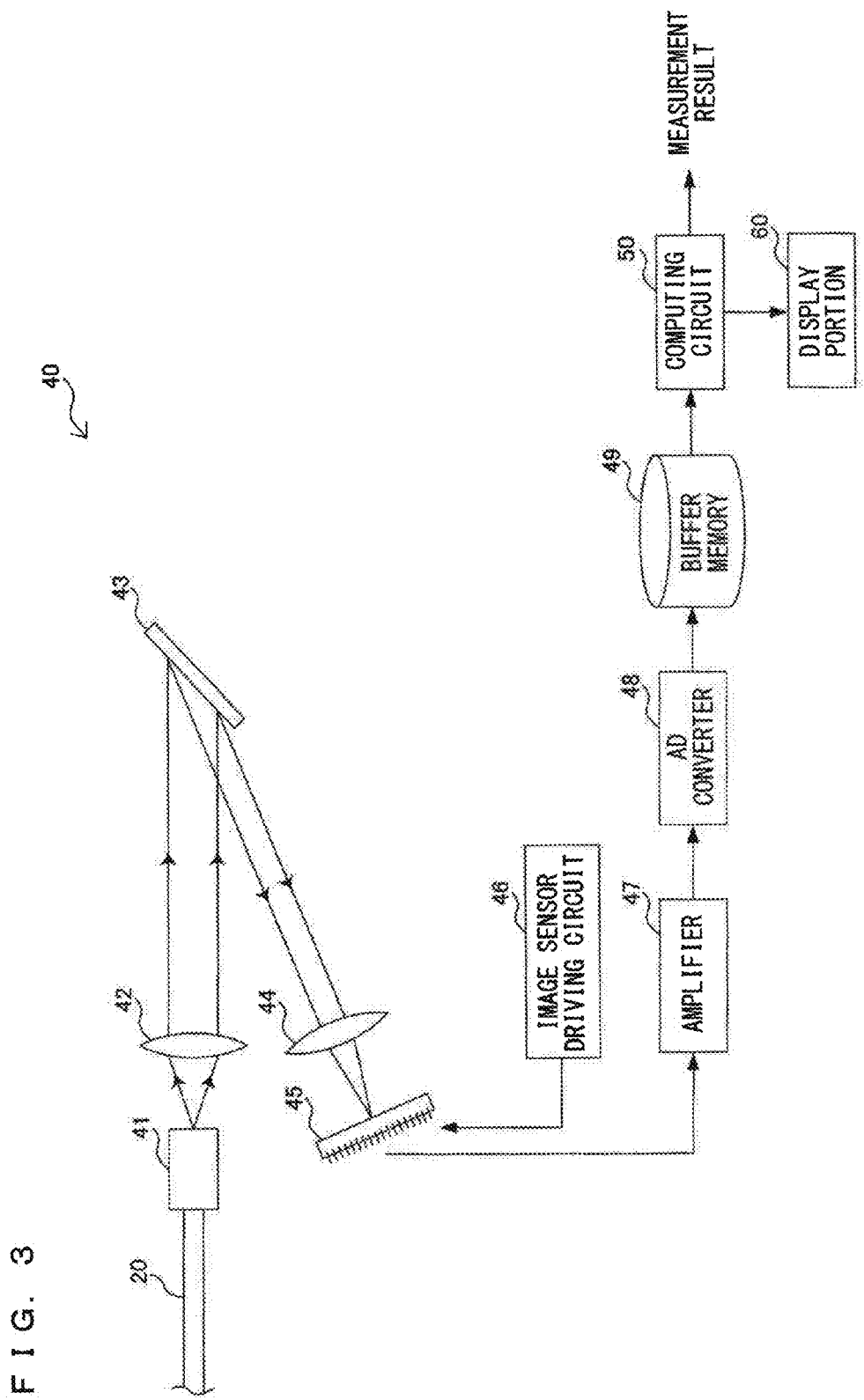
FIG. 3 is a diagram illustrating a structural example of a spectroscopy 40 of the optical displacement gage 1 illustrated in FIG. 1.

FIG. 3 is a diagram illustrating a structural example of the spectroscopy 40 of the optical displacement gage 1 illustrated in FIG. 1. The spectroscopy 40 includes a ferrule 41, a collimator lens 42, a diffraction grating 43, an imaging lens 44, a one-dimensional image sensor 45, an image sensor driving circuit 46, an amplifier 47, an AD converter 48, a buffer memory 49, a computing circuit 50 and a display portion 60.

The ferrule 41 is a coupling member for retaining an end portion of the optical fiber for transmitting the interference light including the reflection light of the sensing light L from the reference surface and the reflection light from the work W. The ferrule 41 is provided at the end portion of the optical fiber extending from the fiber splitter 19.

The collimator lens 42 is a condensing lens that receives light in which the interference light emerging from the ferrule 41, i.e., the reflection light reflected on the surface of the work W and the reflection light reflected on the reference surface (the emergence end surface 33 of the rod lens 32) are superimposed, and condenses the light so as to emerge as parallel rays substantially parallel to the center axis.

The diffraction grating 43 is a dispersing element which disperses the interference light, so that the interference light from the collimator lens 42 enters the diffraction grating 43 and emerges in respective different direction in accordance with the wavelength. The imaging lens 44 is a condensing lens that condenses the interference light from the diffraction grating 43 so as to form the image on the one-dimensional image sensor 45.

The interference light diffracted by the diffraction grating 43 passes through the imaging lens 44 and afterwards forms images at different positions on the one-dimensional image sensor 45 in accordance with the wavelengths. In this case, the two reflection lights having respective different transmission path interfere with each other constructively or destructively in accordance with the wavelength in the interference light.

The one-dimensional image sensor 45 is an image sensor that can detect an image forming position (one-dimensional position) of the interference light condensed by the imaging lens 44. The one-dimensional image sensor 45 is constituted of an image sensing device such as a charge coupled device (CCD). The image sensing device is constituted of a plurality of light receiving elements, e.g., photo diodes (PD). In this case, the image sensing device receives the dispersed interference light, each of the plurality of light receiving elements produces a detection signal in accordance with the light reception amount. The one-dimensional image sensor 45 has a structure in which such the plurality of light receiving elements are arranged linearly. The image sensor driving circuit 46 is a driver circuit for controlling to drive the one-dimensional image sensor 45. The one-dimensional image sensor 45 performs an operation of image sensing repeatedly at a predetermined time interval.

The detection signal delivered from the one-dimensional image sensor 45 is supplied to the amplifier 47, which amplifies the power of the detection signal. The detection signal after the power amplification by the amplifier 47 is supplied to the AD converter 48, which converts the analog signal into a digital signal that is stored in the buffer memory 49.

The computing circuit 50 performs an operation of computing a displacement amount of the work W based on detection data in the buffer memory 49, i.e., pixel data of the individual light receiving elements, and delivering a result of the computation as a measurement result to an external device. The display portion 60 is a display device for displaying the measurement result and the detection data on a monitor screen.

Figure 4:
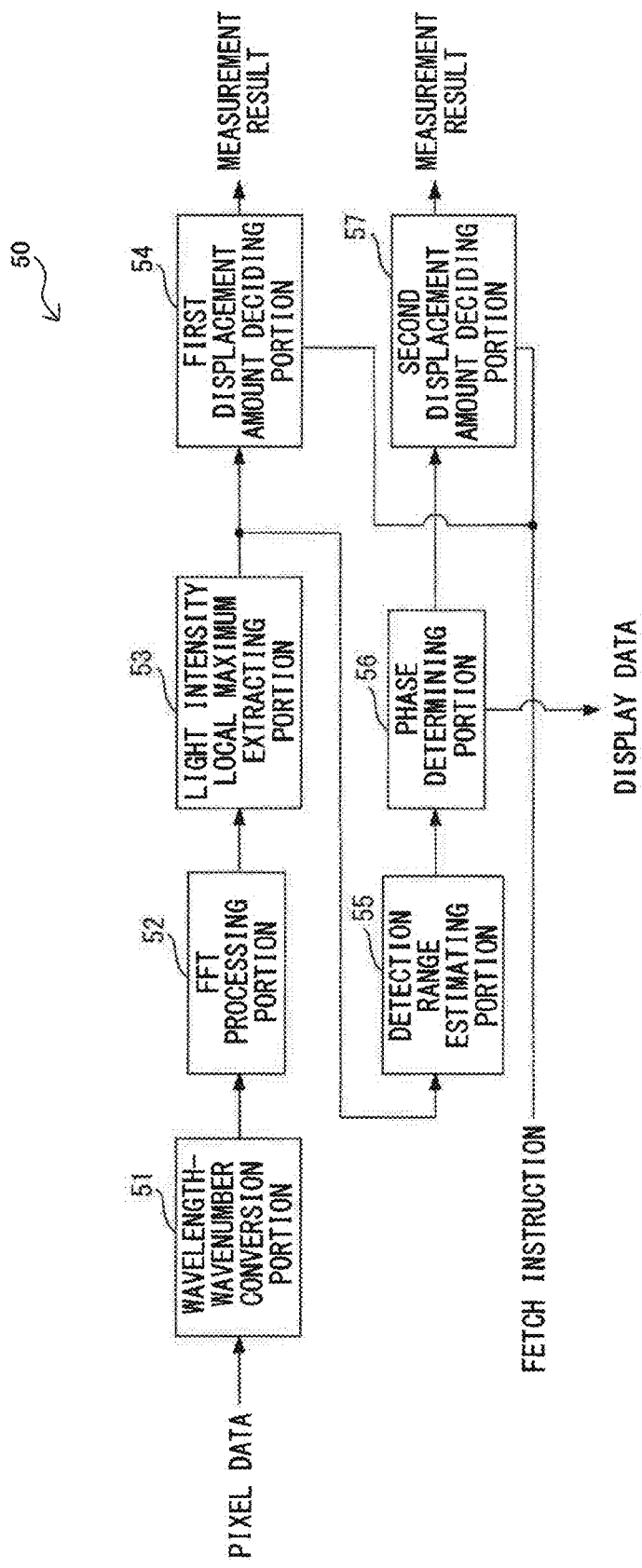
FIG. 4 is a block diagram illustrating a structural example of a computing circuit 50 of the spectroscopy 40 illustrated in FIG. 3.

FIG. 4 is a block diagram illustrating a structural example of the computing circuit 50 of the spectroscopy 40 illustrated in FIG. 3. The computing circuit 50 includes a wavelength-wavenumber conversion portion 51, an FFT processing portion 52, a light intensity local maximum extracting portion 53, a first displacement amount deciding portion 54, a detection range estimating portion 55, a phase determining portion 56 and a second displacement amount deciding portion 57. The computing circuit 50 performs an operation of deciding a displacement amount of the work W based on optical intensity distribution with respect to the wave number of the interference light after the dispersion.

The wavelength-wavenumber conversion portion 51 performs an operation of reading out the pixel data from the buffer memory 49, and converting a relationship between a light amount I and a wavelength $\lambda$ that indicates the optical intensity distribution including the light reception amount data of the individual light receiving elements into a relationship between the light amount I and the wave number (an inverse number of the wavelength) $1/\lambda$. When the relationship between the light amount I and the wavelength $\lambda$ is converted into the relationship between the light amount I and the wave number $1/\lambda$, a period of the intensity distribution curve can be made to approach a single period distribution. In other words, the wavelength-wavenumber conversion portion 51 is a unit for converting the optical intensity distribution with respect to the wavelength $\lambda$ of the interference light so as to generate the optical intensity distribution with respect to the wave number $1/\lambda$.

The FFT processing portion 52 performs a process of discrete Fourier transformation of the optical intensity distribution with respect to the wave number of the interference light after the dispersion, so as to determine the optical intensity distribution with respect to spatial frequency of the light intensity for the wave number. Specifically, the FFT processing portion 52 performs the operation of performing fast Fourier transformation (FFT) of the conversion result by the wavelength-wavenumber conversion portion 51 and generating the intensity data for the individual spatial frequency.

The light intensity local maximum extracting portion 53 performs an operation of extracting local maximum in the optical intensity distribution with respect to a spatial frequency based on the intensity data for the individual spatial frequency generated by the FFT processing portion 52. The local maximum is determined by an interpolation process such as a barycenter process of the intensity data having intensity that exceeds a predetermined threshold value. The extraction of the local maximum is performed repeatedly at a predetermined time interval every time when the pixel data is updated.

The first displacement amount deciding portion 54 performs an operation of deciding a displacement amount of the work W based on the spatial frequency at the local maximum extracted by the light intensity local maximum extracting portion 53, so as to deliver the decision result as a measurement result. The spatial frequency is a physical quantity proportional to a distance between the work W and the reference surface or a variation of the distance. Here, it is supposed that the operation is performed so that the spatial frequency at the local maximum data is fetched responding to a fetch instruction from the external device so as to decide the displacement amount.

The phase determining portion 56 performs an operation of determining phase of the frequency component corresponding to the spatial frequency at the local maximum extracted by the light intensity local maximum extracting portion 53. Specifically, every time when the FFT spectrum data, i.e., the intensity data for the individual spatial frequency is obtained, the relative phases are combined so as to perform an operation of computing the absolute phase corresponding to the reference point.

The second displacement amount deciding portion 57 performs an operation of deciding a displacement amount of the work W based on the phase determined by the phase determining portion 56 and delivering the decision result as a measurement result. Here, it is supposed that the operation is performed so that the phase data is fetched responding to a fetch instruction from the external device so as to decide the displacement amount.

The detection range estimating portion 55 performs an operation of estimating a detection range of the absolute phase based on the spatial frequency at the local maximum extracted by the light intensity local maximum extracting portion 53.

The phase determining portion 56 performs an operation of computing the absolute phase by referring to a result of the estimation by the detection range estimating portion 55, if necessary. In addition, the phase determining portion 56 performs an operation of generating display data for warning the user when there is a possibility that a variation of the displacement amount is so large that combination of the relative phases cannot follow properly.

In addition, it is supposed that there are a general mode for deciding the displacement amount directly from the spatial frequency at the local maximum and a high accuracy mode for deciding the displacement amount from the absolute phase of the frequency component corresponding to the spatial frequency at the local maximum, which can be switched selectively.

If the general mode and the high accuracy mode are used by switching selectively, for example, when the work W is positioned in a desired measurable range, the optical displacement gage 1 should be operated in the general mode for measuring the displacement amount of the work W. Then, the positioning can be performed accurately without missing a value even if the work W to be measured is moved at relatively high speed. After that, the operation should be switched to the high accuracy mode, so that a surface shape of the work W can be measured more accurately. In this way, if the general mode and the high accuracy mode are switched selectively, the single displacement gage can realize positioning of the work W as well as measuring a minute shape of the work surface, so that space saving can be realized. Note that switching between the general mode and the high accuracy mode may be performed based on an instruction signal from the external device, or based on an operation of an operating switch provided to the optical displacement gage 1. In addition, instead of switching between the general mode and the high accuracy mode selectively, the general mode and the high accuracy mode may be performed simultaneously so as to deliver displacement amounts that are obtained as measurement results in the individual modes.

Figure 5:
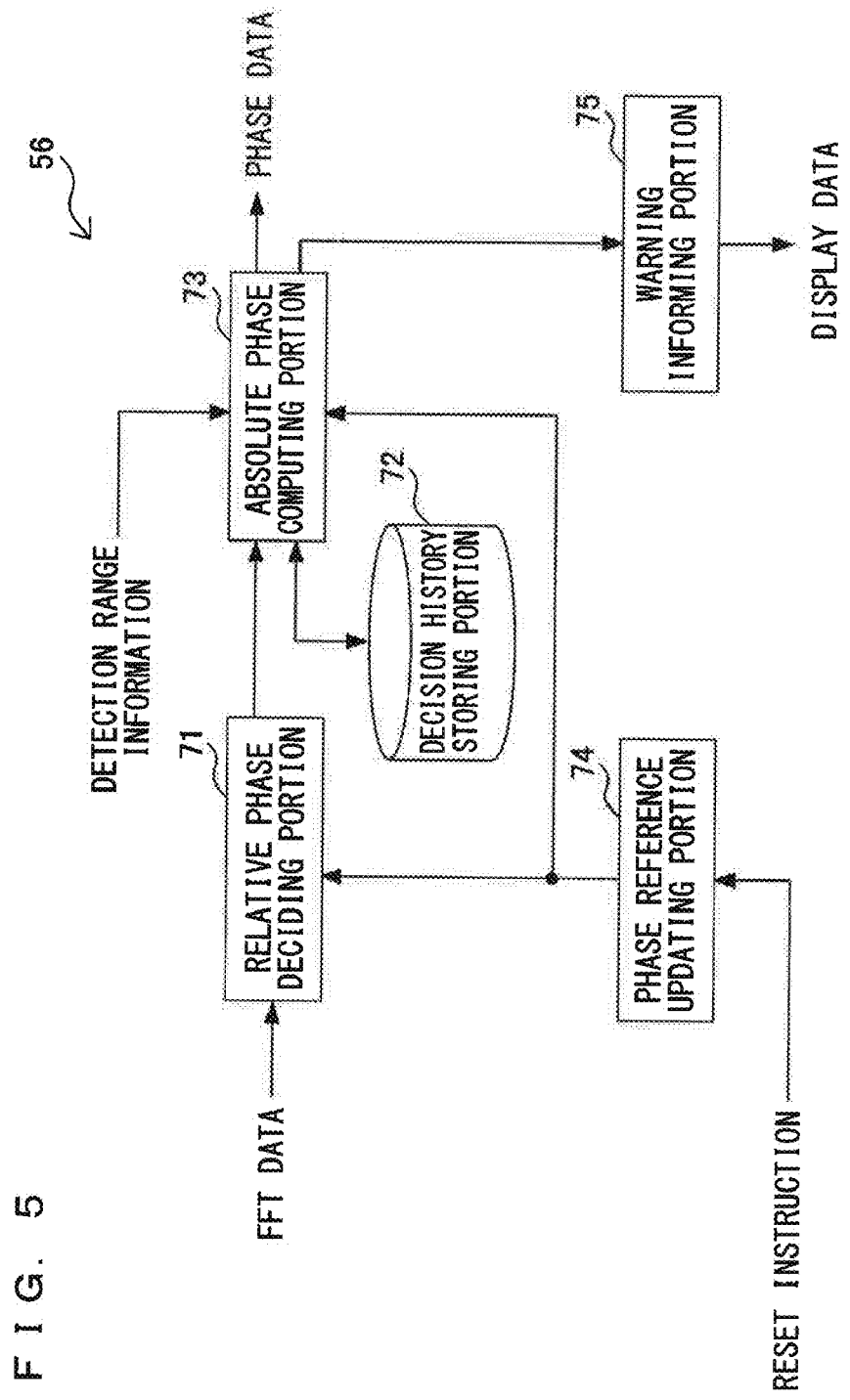
FIG. 5 is a block diagram illustrating a structural example of a phase determining portion 56 of the computing circuit 50 illustrated in FIG. 4.

FIG. 5 is a block diagram illustrating a structural example of the phase determining portion 56 of the computing circuit 50 illustrated in FIG. 4. The phase determining portion 56 includes a relative phase deciding portion 71, a decision history storing portion 72, an absolute phase computing portion 73, a phase reference updating portion 74 and a warning informing portion 75. The relative phase deciding portion 71 performs an operation of deciding the relative phase of the frequency component corresponding to the spatial frequency at the local maximum extracted by the light intensity local maximum extracting portion 53, which is frequency component of the optical intensity distribution with respect to the wave number, within a range of 360 degrees based on the FFT spectrum data.

The absolute phase computing portion 73 performs an operation of combining the relative phase based on a result of the decision by the relative phase deciding portion 71 and past decision result stored in the decision history storing portion 72 as the decision history, determining current values of the absolute phase, and delivering the current value as phase data to the second displacement amount deciding portion 57. Specifically, if an absolute value of a difference between the last obtained relative phase and the just previously obtained relative phase exceeds a first threshold value Th1, it is decided that the relative phase has been obtained in excess of the upper limit or the lower limit of the relative phase, and the absolute phase computing portion 73 updates the current value of the absolute phase in the operation by combining the relative phase with a compensation corresponding to the excess.

On the other hand, if the absolute value of the difference between the last obtained relative phase and the just previously obtained relative phase is the first threshold value Th1 or smaller, the difference between the last obtained relative phase and the just previously obtained relative phase is added as it is for updating the current value of the absolute phase in the operation.

The combining operation of the relative phases is performed as follows. If the difference between the last obtained relative phase and the just previously obtained relative phase is larger than the first threshold value Th1, it is decided that the lower limit of the relative phase has been crossed. Then, 360 degrees is subtracted from the difference between the last obtained relative phase and the just previously obtained relative phase, and the result value is added for updating the current value of the absolute phase. Further, if the difference between the last obtained relative phase and the just previously obtained relative phase is smaller than $-Th1$, it is decided that the upper limit of the relative phase has been crossed. Then, 360 degrees is added to the difference between the last obtained relative phase and the just previously obtained relative phase, and the result value is added for updating the current value of the absolute phase.

The phase reference updating portion 74 performs an operation of updating a reference point of the phase based on a reset instruction from the external device such as a console or a programmable controller. The reference point of the relative phase and the reference point of the absolute phase does not necessarily correspond with each other. Here, however, it is supposed that these reference points correspond with each other, and the reference points are updated at the timing when the reset instruction is issued.

The absolute phase computing portion 73 performs an operation of determining the absolute phase based on the detection range information from the detection range estimating portion 55. Specifically, in the case where there is a possibility that a variation of the displacement amount is so large that combination of the relative phases cannot follow or in other cases, a result of the estimation by the detection range estimating portion 55 is referred, if necessary, so that an operation of correcting the current value of the absolute phase is performed.

In the second displacement amount deciding portion 57, the phase data is fetched from the absolute phase computing portion 73 at a timing when the fetch instruction is issued, so that an operation of deciding a displacement amount based on the current value of the absolute phase is performed.

In addition, the absolute phase computing portion 73 performs an operation of instructing the warning informing portion 75 to perform the warning display when there is a possibility that a variation of the displacement amount is so large that combination of the relative phases cannot follow. Specifically, if the absolute value of the difference between the last obtained relative phase and the just previously obtained relative phase exceeds a second threshold value Th2 that is smaller than the first threshold value Th1, the warning display is instructed, and the display data for warning is generated. If Th1 is 180 degrees, for example, Th2 is set to be 90 degrees.

Figure 6:
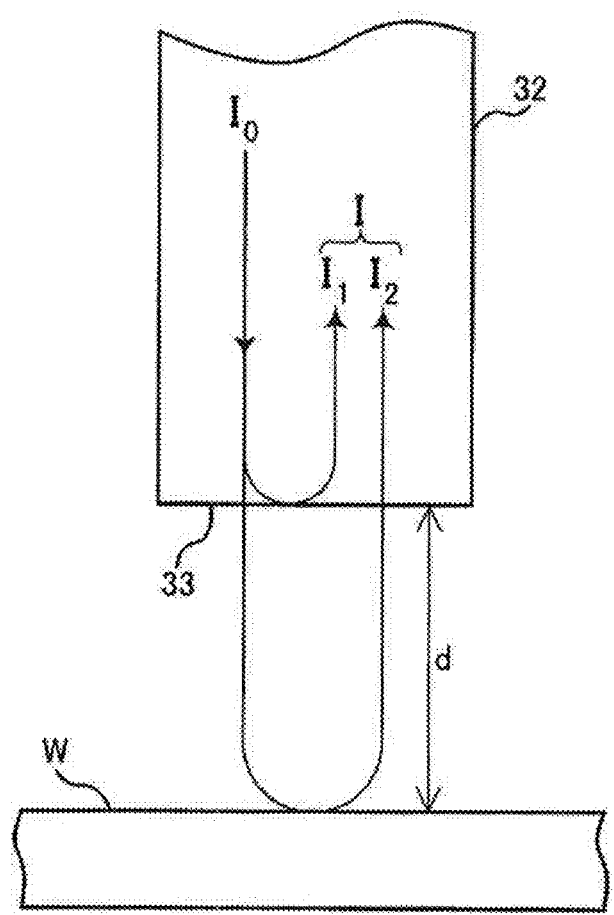
FIG. 6 is an explanatory diagram illustrating schematically a situation where reflection light $I_1$ from an emergence end surface 33 of a rod lens 32 and reflection light $I_2$ from a surface of a work W are observed as interference light I.

FIG. 6 is an explanatory diagram illustrating schematically a situation where reflection light $I_1$ from the emergence end surface 33 and reflection light $I_2$ from the surface of the work W among the sensing light $I_0$ emerging from the emergence end surface 33 of the rod lens 32 are observed as interference light I.

When the sensing light $I_0$ is expressed by "$i_0 = a_0 \times \sin(\omega t)$", the reflection light $I_1$ is expressed by "$i_1 = a_1 \times \sin(\omega t + 2\pi x_1/\lambda)$", and the reflection light $I_2$ is expressed by "$i_2 = a_2 \times \sin(\omega t + 2\pi x_2/\lambda)$", then the intensity of the interference light I is expressed by "time average of $(i_1 + i_2)^2 = (a_1^2 + a_2^2) + 2 \times a_1 \times a_2 \times$ cos($4\pi d/\lambda$)". Here, "$x_2-x_1=2d$" holds using a distance d between the surface of the work W and the emergence end surface 33 of the rod lens 32.

As understood from the above relationship equation, the intensity of the interference light I has a maximum value $(a_1+a_2)^2$ when $4\pi d/\lambda=2n\pi$ (n is an integer) and has a minimum value $(a_1-a_2)^2$ when $4\pi d/\lambda=(2n+1)\pi$.

The frequency of the local maximum in the FFT spectrum obtained from the relationship between the light amount I and the wave number $1/\lambda$, i.e., the spatial frequency, corresponds to the inverse number of $(1/\lambda_1-1/\lambda_2)$. Therefore, using the "$4\pi d\times(1/\lambda_1-1/\lambda_2)=2\pi$" obtained from the above relationship equation, the distance d can be determined as "spatial frequency×½".

(Intensity Distribution with Respect to Wavelength)

Figure 7A:
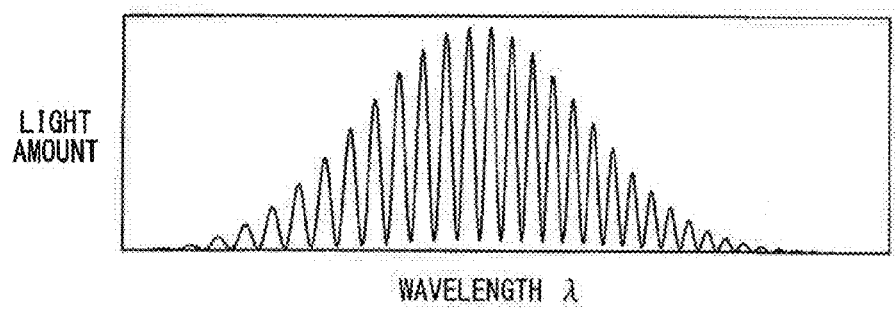
FIGS. 7A and 7B are diagrams illustrating an example of an operation of the spectroscopy 40 illustrated in FIG. 3, in which optical intensity distribution with respect to the wavelength of interference light after dispersion and optical intensity distribution with respect to the wave number are illustrated.
Figure 7B:
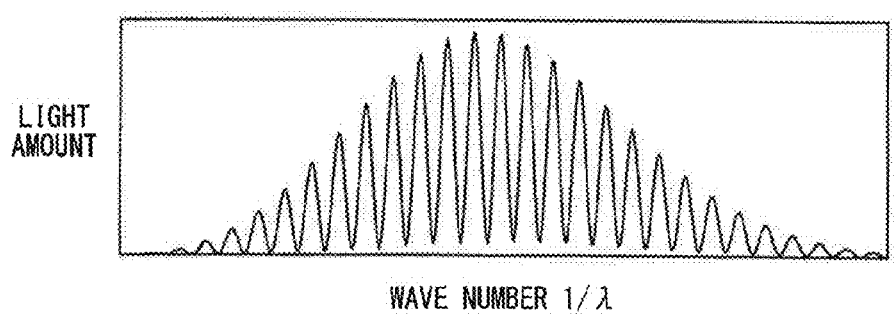

FIGS. 7A and 7B are diagrams illustrating an example of an operation of the spectroscopy 40 illustrated in FIG. 3, in which optical intensity distribution with respect to the wavelength of interference light after the dispersion and optical intensity distribution with respect to the wave number are illustrated. FIG. 7A illustrates a state where the light amount varies tremendously along with an increase of the wavelength λ, in which the horizontal axis represents the wavelength λ while the vertical axis represents the light amount. The wavelength λ corresponds to a position on the one-dimensional image sensor 45.

The light reception amount detected by the one-dimensional image sensor 45 becomes maximum at the wavelength λ that satisfies "$4\pi d/\lambda=2n\pi$", and becomes minimum at the wavelength λ that satisfies "$4\pi d/\lambda=(2n+1)\pi$". Therefore, the light amount varies tremendously in a periodic manner along with an increase of the wavelength λ.

Note that the envelope connecting the local maximum in the light amount distribution is a mountain-like curve with a peak at the center wavelength of the sensing light L, corresponding to Gaussian distribution of the intensity distribution of the wavelengths contained in the sensing light L.

FIG. 7B illustrates a state in which the light amount varies periodically along with an increase of the wave number $1/\lambda$, in which the horizontal axis represents the wave number $1/\lambda$ while the vertical axis represents the light amount. As to the detection data of the one-dimensional image sensor 45, the relationship between the light amount I and the wavelength λ that indicates the optical intensity distribution including the light reception amount data of the individual light receiving elements is converted into the relationship between the light amount I and the wave number $1/\lambda$, so that the period of the intensity distribution curve can be made to approach the single period distribution.

(FFT Spectrum)

FIG. 8 is a diagram illustrating an example of an operation of the spectroscopy 40 illustrated in FIG. 3, in which the horizontal axis represents the spatial frequency while the vertical axis represents the light intensity, and an FFT spectrum obtained from a relationship between light amount I and wave number $1/\lambda$ is illustrated. The FFT spectrum obtained by Fourier transformation of the relationship between the light amount I and the wave number $1/\lambda$ is constituted of intensity data for the individual spatial frequency.

The spatial frequency of the local maximum in the FFT spectrum is proportional to the optical path difference between the reflection light reflected on the surface of the work W and the reflection light reflected on the emergence end surface 33 of the rod lens 32. Therefore, the distance d between the surface of the work W and the emergence end surface 33 can be computed as ½ of the spatial frequency at the local maximum.

Here, in order to improve the measurement accuracy, the peak point (spatial frequency $f_1$) in the FFT spectrum is not regarded as the local maximum, but a barycenter position is determined for the spatial frequency data in which the light intensity exceeds a predetermined threshold value, so as to determine the local maximum (spatial frequency $f_2$).

If the displacement amount is determined simply from the peak points in the FFT spectrum, a variation of approximately 0.1 μm occurs in the measurement result. However, if the barycenter process as described above is performed, an interpolation effect of approximately 50 times can be obtained. For instance, if the distance d to the work W is approximately 1 mm, the measurement accuracy of approximately 50 nm can be obtained. Further, if the work W is in a static state, the measurement accuracy of approximately 1 nm can be obtained by an averaging process.

Figure 9:
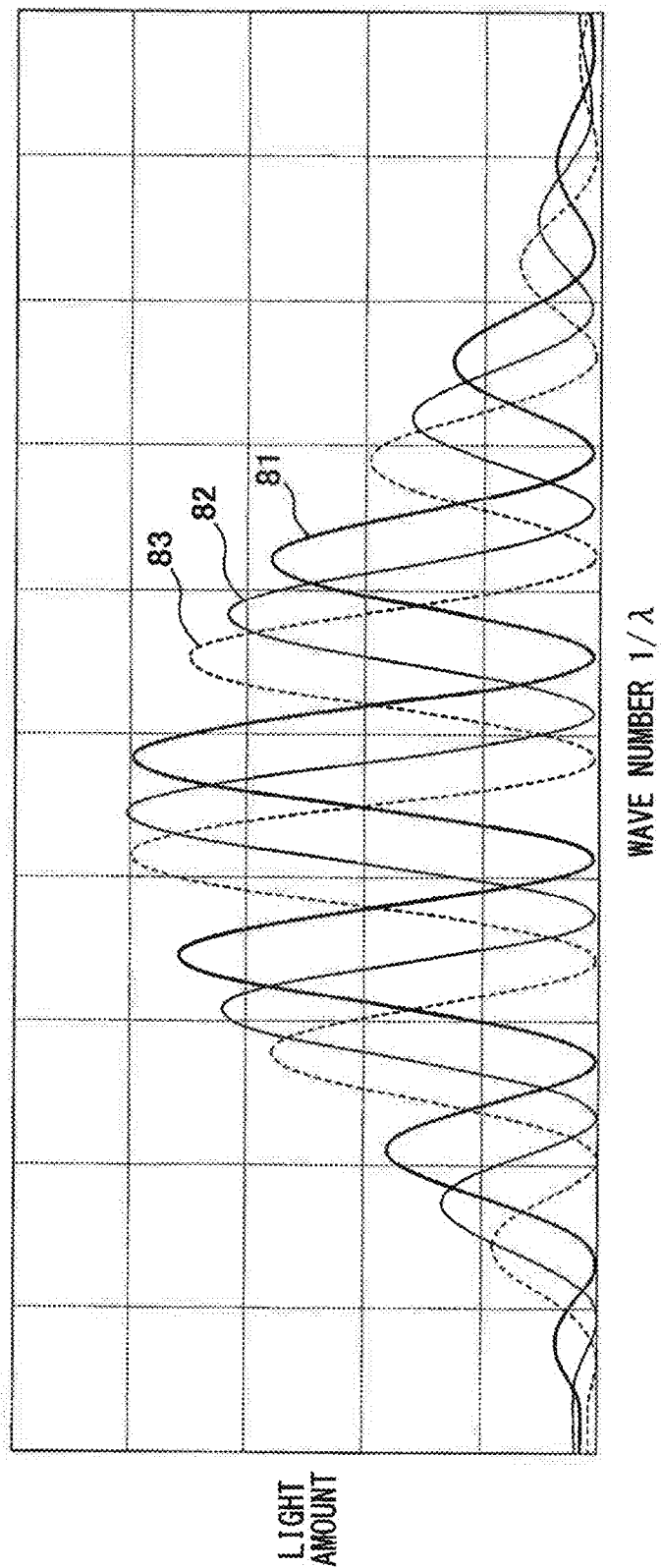
FIG. 9 is a diagram illustrating an example of an operation of the spectroscopy 40 illustrated in FIG. 3, in which three waveforms of intensity distributions 81 to 83 obtained by changing a distance d to the work W are illustrated.

FIGS. 9 and 10 are diagrams illustrating an example of the operation of the spectroscopy 40 illustrated in FIG. 3, in which three waveforms of intensity distributions 81 to 83 obtained by changing the distance d to the work W are illustrated. FIG. 9 illustrates intensity distributions 81 to 83, in which the horizontal axis represents the wave number $1/\lambda$ while the vertical axis represents the light amount. The intensity distribution 81 is the case where the distance d between the work W and the reference surface is 49.9 μm. The intensity distribution 82 is the case where d=50.0 μm, and the intensity distribution 83 is the case where d=50.1 μm.

As understood from comparison among the waveforms of the intensity distributions 81 to 83, the waveform is moved in the direction of decreasing the wave number $1/\lambda$ along with an increase of the distance d.

FIG. 10 illustrates the FFT spectrum obtained from the intensity distributions 81 to 83 illustrated in FIG. 9, in which the horizontal axis represents the spatial frequency while the vertical axis represents the intensity. In the FFT spectrum, there is little difference of intensity among the intensity distributions 81 to 83 except for the position where the spatial frequency is close to zero.

The displacement amount of the work W can be determined from the distance between the peak points in the light amount distribution or from the spatial frequency at the peak point of the FFT spectrum. However, as understood from FIGS. 9 and 10, the accuracy thereof is approximately 0.1 μm at most.

In contrast, the phase of the light amount distribution curve varies largely with respect to the variation of the distance d of approximately 0.1 μm as understood from the FIG. 9. In other words, if the displacement amount of the work W is decided from the phase of the frequency component corresponding to the spatial frequency at the local maximum in the FFT spectrum, the measurement value can be obtained with an accuracy higher than 0.1 μm, e.g., approximately 0.1 nm.

However, the phase that can be decided from one FFT spectrum is limited within a range of 360 degrees. Therefore, the measurable range of the displacement amount is narrow in an order of the center wavelength of the sensing light L. In the present embodiment, the relative phase of the frequency component corresponding to the spatial frequency at the local maximum decided from the FFT spectrum is combined, so that the measurable range of the displacement amount can be expanded.

(Combination of Phases)

Figure 11A:
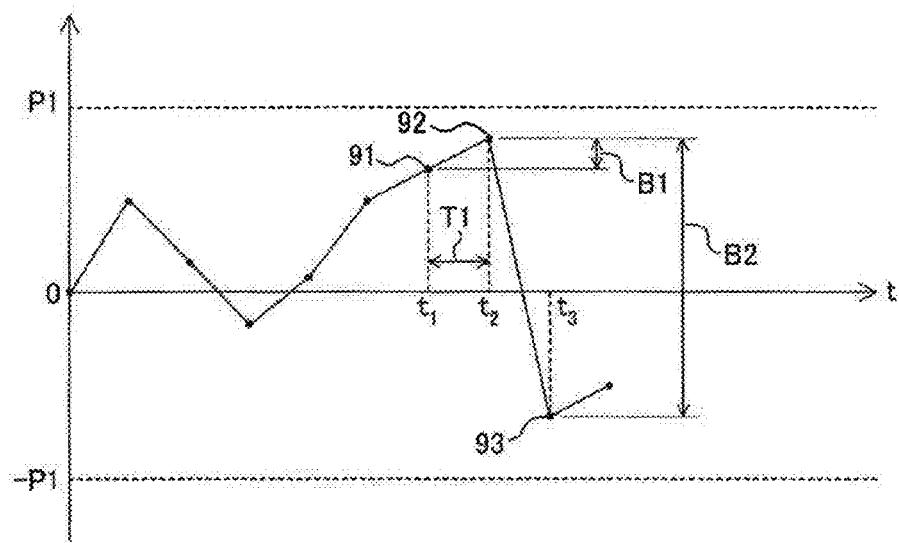
FIGS. 11A and 11B are diagrams illustrating an example of an operation of the spectroscopy 40 illustrated in FIG. 3, in which a process of determining an absolute phase by combining relative phases is illustrated.
Figure 11B:
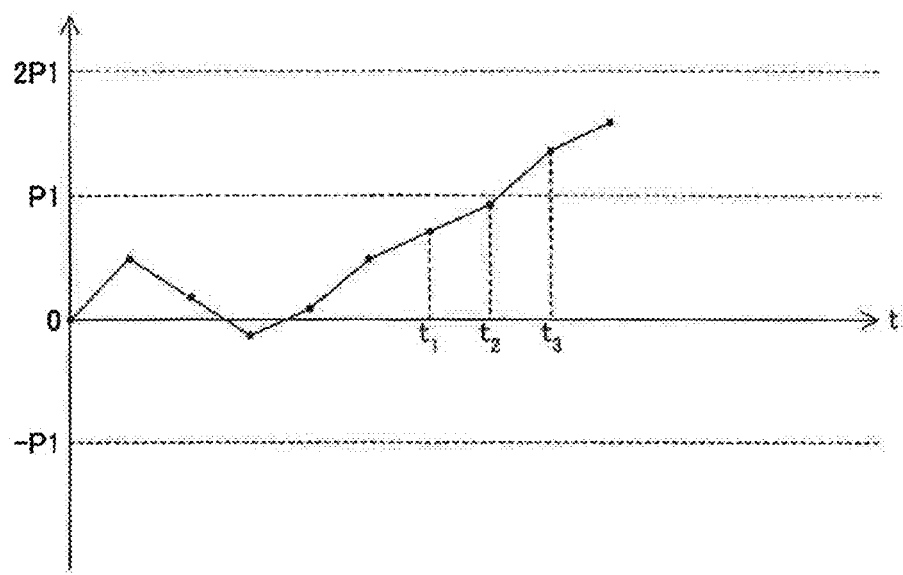

FIGS. 11A and 11B are diagrams illustrating an example of an operation of the spectroscopy 40 illustrated in FIG. 3, in which a process of determining the absolute phase by combining the relative phases is illustrated. FIG. 11A illustrates the relative phases decided every time when the local maximum in the FFT spectrum is extracted. FIG. 11B illustrates the absolute phase obtained by combining the relative phases illustrated in FIG. 11A.

The relative phase is decided based on the FFT spectrum data every time when the local maximum is newly extracted after the reference point is updated at the time point t=0. Here, it is supposed that the relative phase is decided within the range from −P1 to P1. For instance, P1 is 180 degrees. In addition, the update period for the FFT spectrum data is T1.

Concerning the absolute phase, if the absolute value of the difference between the last obtained relative phase and the just previously obtained relative phase is larger than the first threshold value Th1 (e.g., Th1=P1), it is decided that the relative phase has been obtained crossing the upper limit or the lower limit of the relative phase, and the relative phases are combined for updating the current value of the absolute phase.

In contrast, if the absolute value of the difference between the last obtained relative phase and the just previously obtained relative phase is P1 or smaller, the difference between the last obtained relative phase and the just previously obtained relative phase is added as it is for updating the current value of the absolute phase.

Specifically, the absolute value B1 of the relative phase difference between the detection point 91 at the time point $t_1$ and the detection point 92 at the time point $t_2$ is smaller than P1. Therefore, the difference between the relative phase of the detection point 92 and the relative phase of the detection point 91 obtained just previously is added as it is for updating the current value of the absolute phase, so that the absolute phase at the time point $t_2$ is obtained.

In addition, concerning the detection point 92 at the time point $t_2$ and the detection point 93 at the time point $t_3$, the absolute value B2 of the difference between the relative phases is larger than P1. Therefore, combination of the relative phases is performed. In this case, the difference between the relative phase of the detection point 93 and the relative phase of the detection point 92 obtained just previously is smaller than −P1. Therefore, it is decided that the upper limit P1 of the relative phase is crossed. Then, 360 degrees is added to the difference between the relative phase of the detection point 93 and the relative phase of the detection point 92 obtained just previously for updating the current value of the absolute phase, so that the absolute phase at the time point $t_3$ can be obtained.

Thus, the displacement amount is decided based on the phase of the frequency component corresponding to the spatial frequency at the local maximum in the FFT spectrum. Therefore, dirt on the surface of the object to be measured hardly affects, so that the measurement accuracy can be improved compared with the case where the displacement amount is decided directly from the spatial frequency at the local maximum. In addition, the relative phases are combined so as to determine the absolute phase, and the displacement amount is decided based on the absolute phase. Therefore, the measurable range can be expanded.

FIGS. 12A and 12B are diagrams illustrating a comparison of an example of light amount distribution obtained by using low coherent light as the sensing light L with a case of white light. FIG. 12A illustrates the case of the low coherent light, and FIG. 12B illustrates the case of the white light having a wide wavelength bandwidth.

If the SLD that generates low coherent light having a center wavelength of 0.83 μm and a half width of 0.025 μm is used as the light source for the sensing light L for measuring the work W with a distance d=10 μm, the light amount distribution curve shows mild variation of the light amount along with a variation of the wave number 1/λ.

In contrast, if the halogen lamp that generates white light having a wide wavelength bandwidth with a center wavelength of 0.60 μm and a half width of 0.20 μm is used as the light source of the sensing light L for measuring the work W with a distance d=10 μm, the light amount distribution curve shows tremendous variation of the light amount along with a variation of the wave number 1/λ. In other words, the wavelength resolution of the spectroscope is higher in the case where the low coherent light is used as the sensing light L.

Figure 13:
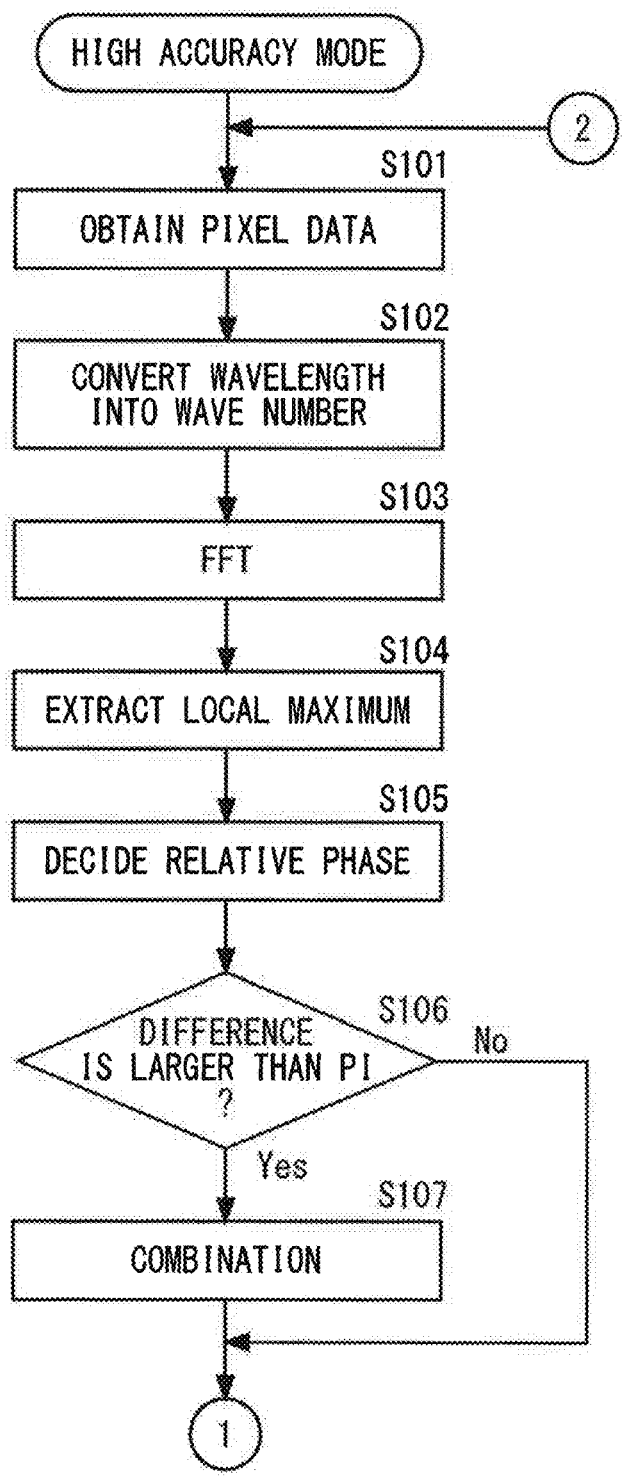
FIG. 13 is a flowchart illustrating an example of an operation of the spectroscopy 40 illustrated in FIG. 3 in a high accuracy mode.
Figure 14:
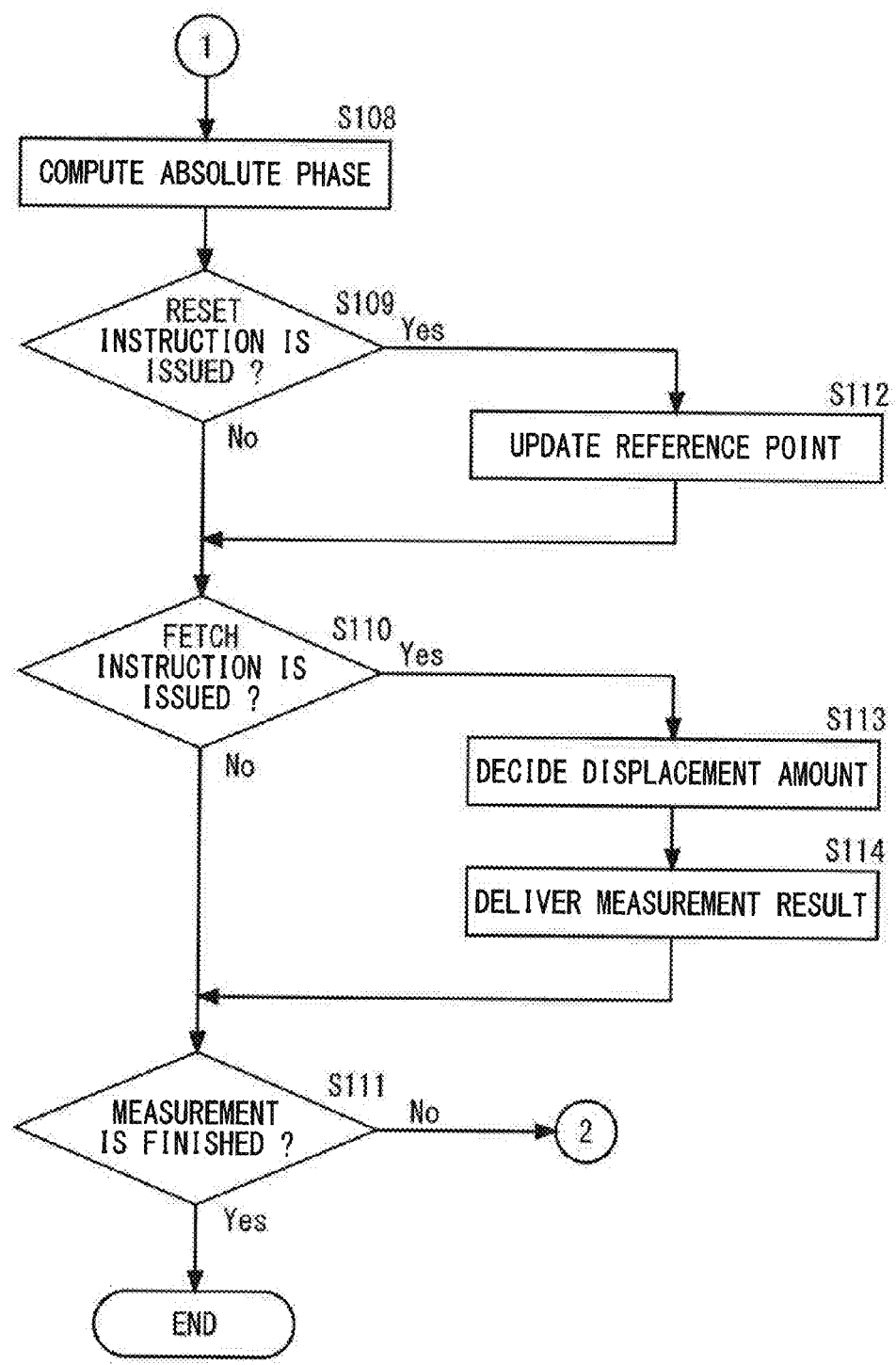
FIG. 14 is a flowchart illustrating an example of an operation of the spectroscopy 40 illustrated in FIG. 3 in a high accuracy mode.

Steps S101 to S114 in FIGS. 13 and 14 is a flowchart illustrating an example of an operation in the high accuracy mode of the spectroscopy 40 illustrated in FIG. 3. First, the wavelength-wavenumber conversion portion 51 obtains the pixel data generated by the one-dimensional image sensor 45 from the buffer memory 49 and converts the wavelength λ in the light amount distribution into the wave number 1/λ (Steps S101 and S102).

Next, the FFT processing portion 52 performs the FFT of the light amount distribution of the wave number 1/λ, so as to generate the FFT spectrum data (Step S103). The light intensity local maximum extracting portion 53 extracts the local maximum from the FFT spectrum based on the FFT spectrum data (Step S104).

The phase determining portion 56 decides the relative phase of the extracted frequency component corresponding to the spatial frequency at the local maximum based on the FFT spectrum data (Step S105). If the absolute value of the difference between the last obtained relative phase and the just previously obtained relative phase is larger than P1, i.e., 180 degrees, the phase determining portion 56 decides that the relative phase has been obtained crossing the upper limit or the lower limit of the relative phase, and combines the relative phases for updating the current value of the absolute phase (Steps S106 to S108).

In contrast, if the absolute value of the difference between the last obtained relative phase and the just previously obtained relative phase is P1 or smaller, the difference between the last obtained relative phase and the just previously obtained relative phase is added as it is so that the current value of the absolute phase is updated.

Next, if the reset instruction is issued from the external device, the phase determining portion 56 updates the reference point of the phase based on the reset instruction (Steps S109 and S112). Next, if the fetch instruction is issued from the external device, the second displacement amount deciding portion 57 fetches the current value of the absolute phase from the phase determining portion 56 based on the fetch instruction and decides the displacement amount so as to deliver the same as a measurement result (Steps S110, S113 and S114).

The process procedure from Step S101 to Step S110 is repeated until the measurement is finished (Step S111).

According to the present embodiment, the displacement amount is decided based on the phase of the frequency component corresponding to the spatial frequency at the local maximum. Therefore, dirt on the surface of the work W hardly affects, so that the measurement accuracy can be improved compared with the case where the displacement amount is decided from the spatial frequency. In addition, the relative phases are combined so as to determine the absolute phase, and the displacement amount is decided based on the absolute phase. Therefore, the measurable range can be expanded.

Note that the present embodiment describes the example where the relative phase is decided within a range of 360 degrees, and the combination of the relative phases is performed if the absolute value of the difference between the last obtained relative phase and the just previously obtained relative phase is larger than 180 degrees, but the present invention is not limited to this structure. For instance, it is possible to decide the relative phase within a range of ±90 degrees, and to perform the combination of the relative phases if the absolute value of the difference between the last obtained relative phase and the just previously obtained relative phase is larger than 90 degrees. In this case, if the absolute value of the difference between the last obtained relative phase and the just previously obtained relative phase is larger than the second threshold value Th2=45 degrees, for example, the warning display is performed.

In addition, the present embodiment describes the example of the optical displacement gage that decides the displacement amount of the work W and delivers the same as a measurement result, but the present invention is not limited to this. The present invention also covers a film thickness measuring apparatus for measuring a film thickness of a transparent film.

In addition, the present embodiment describes the example of the optical displacement gage 1 that utilizes the interference phenomenon between light reflected on the emergence end surface 33 of the rod lens 32 and light reflected on the surface of the object to be measured, so as to measure a variation of a distance between the emergence end surface 33 and the object to be measured, but the present invention is not limited to this. For instance, the present invention also covers an optical displacement gage in which a part of the sensing light emerging from the rod lens is reflected toward the rod lens, and the reflection light is reflected again by a mirror disposed at the focal point toward the object to be measured, so as to extend the distance to the object to be measured.

Figure 15:
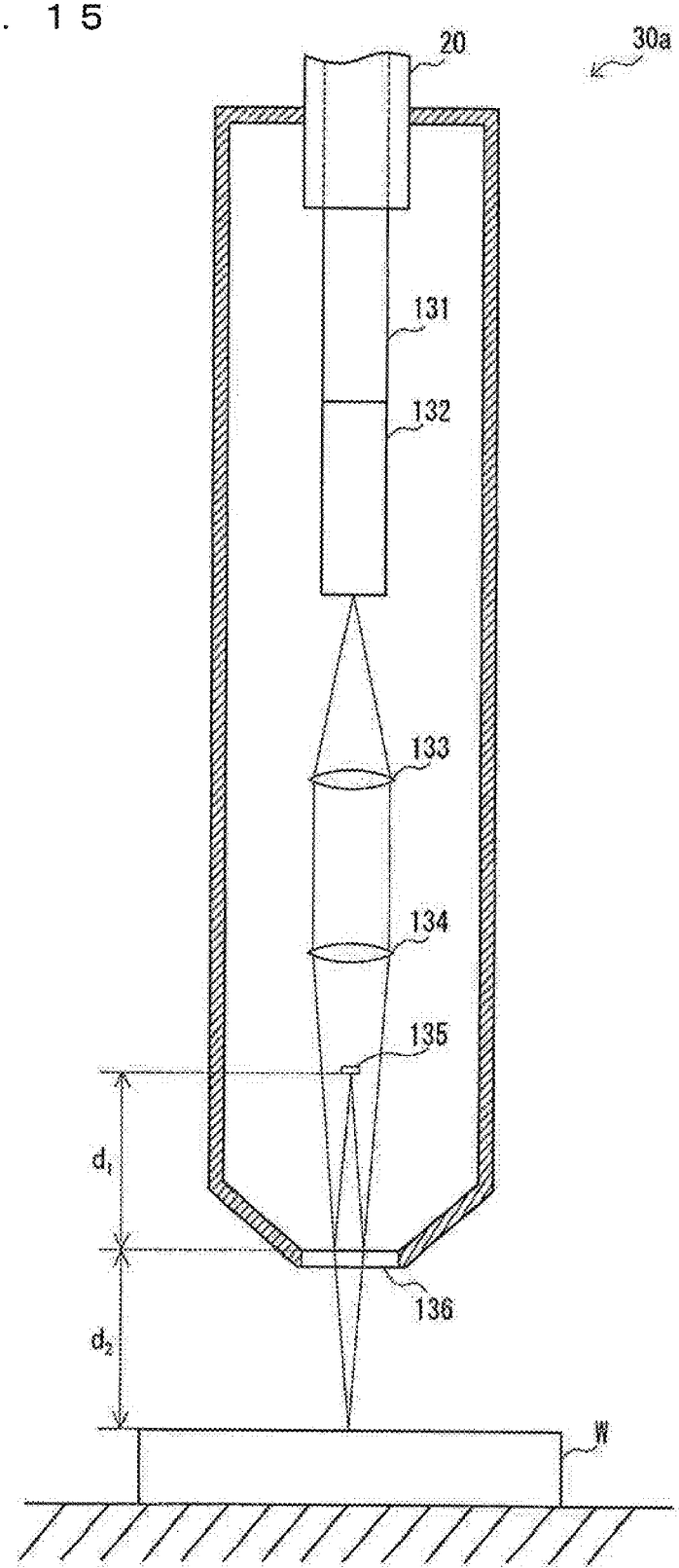
FIG. 15 is a diagram illustrating another structural example of the optical displacement gage according to the present invention, in which an inner structure of a head portion 30a is illustrated.

FIG. 15 is a diagram illustrating another structural example of the optical displacement gage according to the present invention, in which an inner structure of a head portion 30a is illustrated. The head portion 30a of this optical displacement gage includes a pigtail fiber 131 extending from the end surface of the transmission cable 20, the rod lens 132 joined to the end surface of the pigtail fiber 131, optical lenses 133 and 134, a pin mirror 135 and a half mirror 136.

The pigtail fiber 131 is a fiber tip having an inclined end surface for decreasing back reflection. The optical lens 133 is a convex lens for condensing the sensing light from the rod lens 132 so as to emerge light substantially parallel to the center axis. The optical lens 134 is a convex lens for condensing the light from the optical lens 133 so as to emerge the light toward the object to be measured. The pigtail fiber 131, the rod lens 132, the optical lenses 133 and 134 are disposed in the case so that the center axes thereof are substantially agree with each other.

The half mirror 136 is an optical element that reflects a part of the sensing light from the optical lens 134 toward the optical lens 134 and transmits the other part of the sensing light toward the object to be measured. The half mirror 136 is disposed at the end of the head portion 30a on the emerging side.

The pin mirror 135 is a mirror having a small diameter for reflecting the sensing light reflected by the half mirror 136 toward the object to be measured. The pin mirror 135 is disposed at a vicinity of the focal point of the reflection light from the half mirror 136. Therefore, when the distance between the pin mirror 135 and the half mirror 136 is denoted by $d_1$, the sensing light that passes through the half mirror 136 forms the focal point at the distance $d_1$ from the half mirror 136.

The sensing light that emerges from the emergence end surface of the rod lens 132 enters the half mirror 136 through the optical lenses 133 and 134. A part of this incident light is reflected by the half mirror 136 and is condensed on the pin mirror 135. The sensing light condensed on the pin mirror 135 is reflected by the pin mirror 135, and a part of the reflection light is reflected again by the half mirror 136 so as to enter the optical lens 134 (this is referred to as a first transmission path of the sensing light).

On the other hand, the other part of the sensing light entering the half mirror 136 through the optical lenses 133 and 134 passes through the half mirror 136 so as to irradiate the work W. A part of the sensing light irradiating the work W is reflected on the surface of the work W, and a part of the reflection light enters the half mirror 136. A part of the incident light passes through the half mirror 136 so as to enter the optical lens 134 (this is referred to as a second transmission path of the sensing light).

This optical displacement gage utilizes the interference phenomenon between the reflection light from the work W and the sensing light that is reflected again by the half mirror 136 via the pin mirror 135, so that the displacement amount of the work W can be determined. In this case, the reference surface is the reflection surface of the half mirror 136. In addition, when the distance between the half mirror 136 and the work W is denoted by $d_2$, interference occurs in accordance with an optical path difference between the first transmission path and the second transmission path. Therefore, a variation of a distance difference $(d_2-d_1)$ is determined as a displacement amount.

What is claimed is:

1. An optical displacement gage comprising:
   a sensing light generating unit to generate a sensing light;
   a reference surface to reflect a part of the sensing light while transmitting another part of the sensing light toward an object to be measured;
   a spectroscopic unit to disperse an interference light including a reflection light reflected from the reference surface and reflection light reflected from the object to be measured;
   an optical intensity distribution generating unit to receive the interference light dispersed by the spectroscopic unit so as to generate an optical intensity distribution with respect to a wave number of the interference light;
   a light intensity local maximum extracting unit to convert the optical intensity distribution with respect to the wave number into an optical intensity distribution with respect to a spatial frequency of the light intensity for the wave number, so as to extract a local maximum in the optical intensity distribution with respect to the spatial frequency, repeatedly at a predetermined respective time;
   a phase determining unit to determine a phase of the frequency component corresponding to the spatial frequency at the local maximum in the optical intensity distribution with respect to the wave number; and
   a displacement amount deciding unit to decide a displacement amount of the object to be measured based on the phase determined by the phase determining unit, wherein
   the phase determining unit includes
   a relative phase deciding unit to decide a relative phase of the frequency component within a range of 360 degrees,
   an absolute phase computing unit to compute an absolute phase by combining the relative phase based on the decision result by the relative phase deciding unit and the past decision result by the relative phase, and a phase reference updating unit to update a reference point of the absolute phase based on a reset instruction, and the displacement amount deciding unit decides the displacement amount based on the absolute phase.

2. The optical displacement gage according to claim 1, wherein when a difference between the last obtained relative phase and the just previously obtained relative phase is larger than a first threshold value, the absolute phase computing unit decides that the relative phase has been obtained in excess of an upper limit or a lower limit, and combine the relative phase with a compensation corresponding to the excess.

3. The optical displacement gage according to claim 2, further comprising a display unit to display a warning information when the difference between the last obtained relative phase and the just previously obtained relative phase is larger than a second threshold value that is smaller than the first threshold value.

4. The optical displacement gage according to claim 1, wherein the light intensity local maximum extracting unit performs a barycenter process of the intensity data for the individual spatial frequency so as to determine the local maximum.

5. The optical displacement gage according to claim 1, further comprising a detection range estimating unit to estimate a detection range of the absolute phase based on the spatial frequency at the local maximum, wherein the absolute phase computing unit determines the absolute phase based on the estimation result by the detection range estimating unit.

6. The optical displacement gage according to claim 1, wherein a single mode optical fiber that transmits light in a single mode is used for transmitting the sensing light and the interference light.

7. The optical displacement gage according to claim 6, wherein the sensing light is near infrared light having a narrow wavelength bandwidth compared with white light.

* * * * *